United States Patent
Antol et al.

[11] Patent Number: 5,752,048
[45] Date of Patent: May 12, 1998

[54] DEVICE AND METHOD FOR PROVIDING A SIMULATION OF AN IDLE UART TO PREVENT COMPUTER LOCKUP

[75] Inventors: Shawn Richard Antol, Hanover Park; Raed Mouaffac Hafez, Lake in the Hills, both of Ill.

[73] Assignee: Motorola, Inc., Schaumburg, Ill.

[21] Appl. No.: 600,390

[22] Filed: Feb. 12, 1996

[51] Int. Cl.⁶ .......................... H04M 11/00; H04L 27/10; G06F 1/32
[52] U.S. Cl. .................. 395/750.05; 375/222; 379/93.28
[58] Field of Search .............................. 395/750, 182.22, 395/750.05, 200.54; 375/222; 326/56; 379/93, 93.28

[56] References Cited

U.S. PATENT DOCUMENTS

| | | | |
|---|---|---|---|
| 3,908,086 | 9/1975 | Marino et al. | 370/295 |
| 4,325,147 | 4/1982 | Rothlauf et al. | 370/433 |
| 4,529,895 | 7/1985 | Garverick et al. | 326/56 |
| 4,680,788 | 7/1987 | Cordeiro et al. | 379/93 |
| 4,742,482 | 5/1988 | Inskeep et al. | 395/182.12 |
| 5,107,518 | 4/1992 | Petty, Jr. | 375/222 |
| 5,179,299 | 1/1993 | Tipon | 326/86 |
| 5,555,287 | 9/1996 | Gulick et al. | 379/61 |

Primary Examiner—Gopal C. Ray
Attorney, Agent, or Firm—Darleen J. Stockley

[57] ABSTRACT

The invention prevents an operating system from freezing operation of computer peripherals such as a PCMCIA modem card constructed using an AT&T HSM PID2 Chipset when a suspend mode is activated by the computer. The invention provides a simulation (device: 100, 200; method: 300, 600, 700) of an idle Universal Asynchronous Receiver Transmitter, UART, in a computer peripheral operably coupled to the computer wherein the simulation provides a logic one in a least significant bit position for the PCMCIA data bus, thereby indicating that no data remains to be sent on the PCMCIA data bus.

6 Claims, 5 Drawing Sheets

DEVICE AND METHOD FOR PROVIDING A SIMULATION OF AN IDLE UART TO PREVENT COMPUTER LOCKUP

FIELD OF THE INVENTION

The present invention relates generally to peripheral-computer interaction techniques and more particularly, to PCMCIA cards and computer interaction techniques.

BACKGROUND OF THE INVENTION

Since portable computers have become smaller, peripheral devices have been added to provide increased functionality. A typical type of peripheral device is a thin form computer card that is removable/insertable into a connection that is recessed in a cavity of the computer. Where such a peripheral device meets certain standards adopted by the Japanese Electrical Industry Association (JEIDA) in 1991, the card is typically known as a Personal Computer Memory Card International Association unit/card, i.e., a PCMCIA card. The PCMCIA cards are designed to meet specifications for a socket so that interoperability among different computers is assured.

A PCMCIA card may be utilized as a modem, fax device, LAN, memory device, etc. PCMCIA cards allow the flexibility of traveling with only those peripherals that one feels will be needed and that may be inserted when a particular functionality is desired. Also, PCMCIA cards provide for noncomplex updating of peripheral functionality.

The PCMCIA specification requires that personal computer cards have a 68-pin connector at the end of the card to transmit signals between the computer and the card. Where a PCMCIA card that performs a modem function has been constructed using the AT&T HSM PID2 Chipset and is utilized in a computer, e.g., an NEC Versa 4050C, the operating system of the computer may tend to "lock up" or "freeze" when the suspend mode is initiated at the computer. Once locked-up, the user is incapable of performing any functions, as the machine will not respond to any keyboard action, or mouse activity. This could happen on a laptop as well as a desktop computer.

A suspend mode may be initiated either manually by pushing a suspend button or automatically (e.g., at a predetermined time after the computer has been unused). When the computer "locks up" or "freezes", an AT&T PID2 peripheral device indicates that there is data remaining to be sent to the host software application via the data bus. Unless the computer is reset or restarted, or the modem ejected, the "locked up" or "frozen" mode will prevent the user from accessing the computer. This problem becomes more serious with a laptop computer since a lock-up will drain the battery of the laptop computer.

For example, Windows® 95, owned by Microsoft, Inc., is an operating system that "locks up" or "freezes" when a suspend mode is initiated on a computer having an inserted modem PCMCIA card constructed from the AT&T HSM PID2 Chipset while a modem communication application is open.

Clearly, there is a need for a device and method for preventing the lock-up when a computer enters a suspend mode while a modem communication application is open.

DETAILED DESCRIPTION OF A PREFERRED EMBODIMENT

The present invention prevents an operating system such as Windows® 95 from freezing operation of a computer with an inserted PCMCIA modem card that was constructed using an AT&T HSM PID2 Chipset when a suspend, or sleep, mode is activated by the computer and the modem communication application is open.

The invention provides a simulation of an idle Universal Asynchronous Receiver Transmitter, UART, in a computer peripheral operably coupled to the computer. The simulation provides a logic one in a least significant bit position for the data bus, thereby indicating that no interrupts need to be serviced or no data remains to be sent on the data bus. Hence, this operation prevents locking up by the operating system of the computer when the suspend mode is entered. In the preferred embodiment, the invention prevents locking up of the computer by the Windows® 95 operating system when a communications application such as ProComm Plus® or Quicklink® interacts with an AT&T HSM PID2 based PCMCIA modem card. Hence, this invention is vital to the use of AT&T HSM PID2 PCMCIA modem cards.

Figure 1:
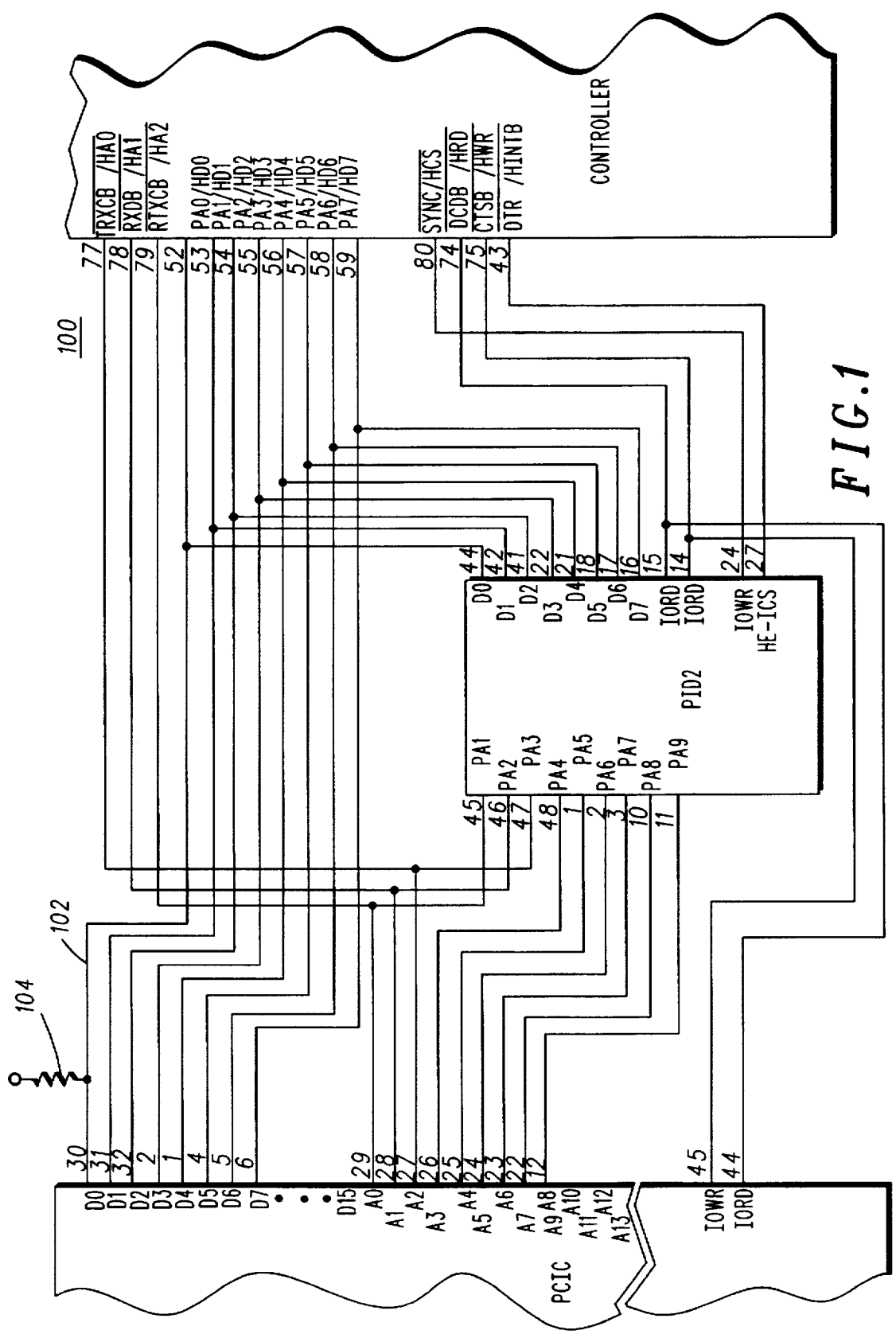
FIG. 1 is a schematic representation of a device in accordance with the present invention.

FIG. 1, numeral 100, is a block diagram of a device in accordance with the present invention. When a computer enters a suspend mode, the device prevents an operating system from locking up the computer when a suspend, or sleep, mode is entered by providing a simulation of an idle Universal Asynchronous Receiver Transmitter, UART, for a computer peripheral operably coupled to the computer. The device includes an electrical path (102) of a data bus, for carrying a signal representing a least significant data bit and a resistor (104), coupled to the electrical path of the data bus and to a logic one voltage, for forcing the least significant data bit to become a logic one when all elements coupled to the data bus are in a high impedance state.

The electrical path of the data bus is typically an electrically conductive trace, e.g., a copper trace. The resistor is selected from an ohmic range of 2.2K to 100K ohms. Voltages such as 3.3V or 5V levels are workable. For example, a 10K ohm resistor is workable. The elements coupled to the data bus typically include: a PCMCIA interface unit (a personal computer memory card international association interface unit) (206), a controller (208), and a PC-Card interface controller (210), PCIC. In general, the device is located on the computer peripheral since the simulation directly corrects the operation of the PCMCIA card constructed from the AT&T HSM PID2 Chipset.

Figure 2:
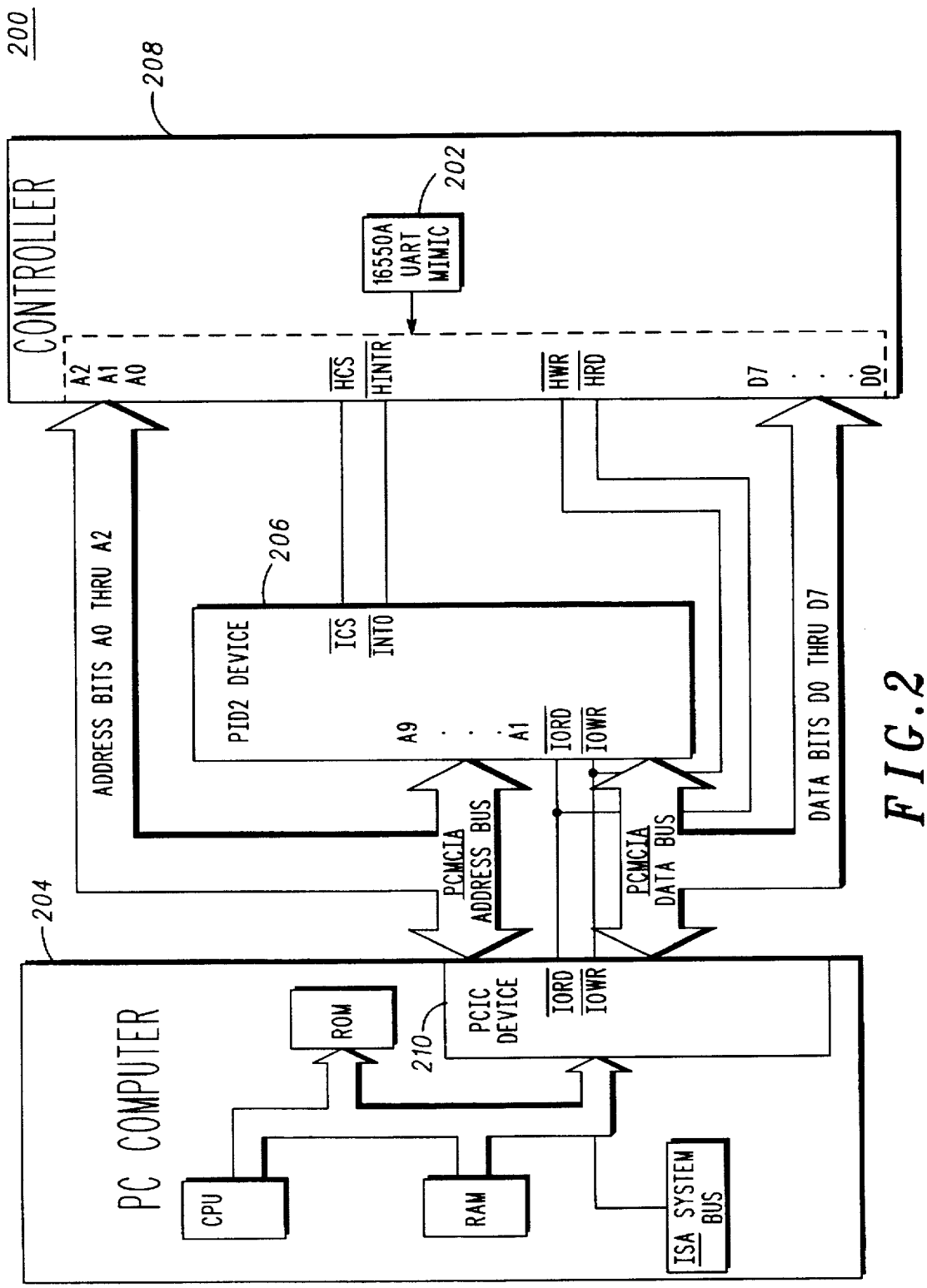
FIG. 2 is a block diagram of a PCMCIA card that utilizes a device in accordance with the present invention.

FIG. 2, numeral 200, is a block diagram of a PCMCIA card that utilizes a device in accordance with the present invention. The PCMCIA unit includes the device for providing, when a computer (204) enters a suspend mode, simulation of an idle Universal Asynchronous Receiver Transmitter UART (202) in a computer peripheral operably coupled to the computer, wherein the idle UART prevents locking up of the computer by the operating system when a suspend mode is entered. The device is as described above.

For example, when a PCMCIA modem card constructed using the AT&T HSM PID2 Chipset is inserted into the socket of a host computer, a memory resident utility software program such as Card and Socket Services® reads the Card Information Structure, CIS, from the card to determine information such as: manufacturer identification, whether the card is a memory or I/O card, control bytes to power-on the card, host memory mapping, etc. The PCMCIA Interface Device (206), PID2, which resides on the modem card, is programmed using information in the CIS to indicate that the card is an I/O card. When programmed as a memory card, the PID2 ignores any I/O data requests.

When a communication application such as ProComm Plus® owned by DataStorm Technologies, or Quicklink® owned by Smith Micro, operates to obtain bytes from the modem card, the package utilizes one of two ways: polled mode or interrupt driven mode. In the polled mode, the application package will periodically read the Interrupt Identification Register/Modem Status Register of the PID2 to determine if the modem card has any data in its buffers that needs to be retrieved by the host computer. Due to buffering and FIFOs it is possible for the modem card to have multiple bytes of data for the host computer to read. Periodically, the host software application flushes the data from the modem card's buffer for storage/processing by the host computer. The modem controller microprocessor (e.g., Z80-182) (208) on the modem card receives chip select and Input/Output Read and Write signals, IORD and IOWR, from the PID2 when the PID2 is programmed as an I/O card.

Typically the SUSPEND mode may be initiated for the computer manually, e.g., by pressing a SUSPEND button on the computer, or automatically, e.g., by utilizing an AUTO-SUSPEND mode such as the AUTO-SUSPEND mode utilized by an Advanced Power Management (APM) system. When a computer has been unused for a predetermined amount of time, APM layer software saves critical system information in non-volatile storage and begins shutting down nonessential hardware devices and any application packages that are running.

Figure 3:
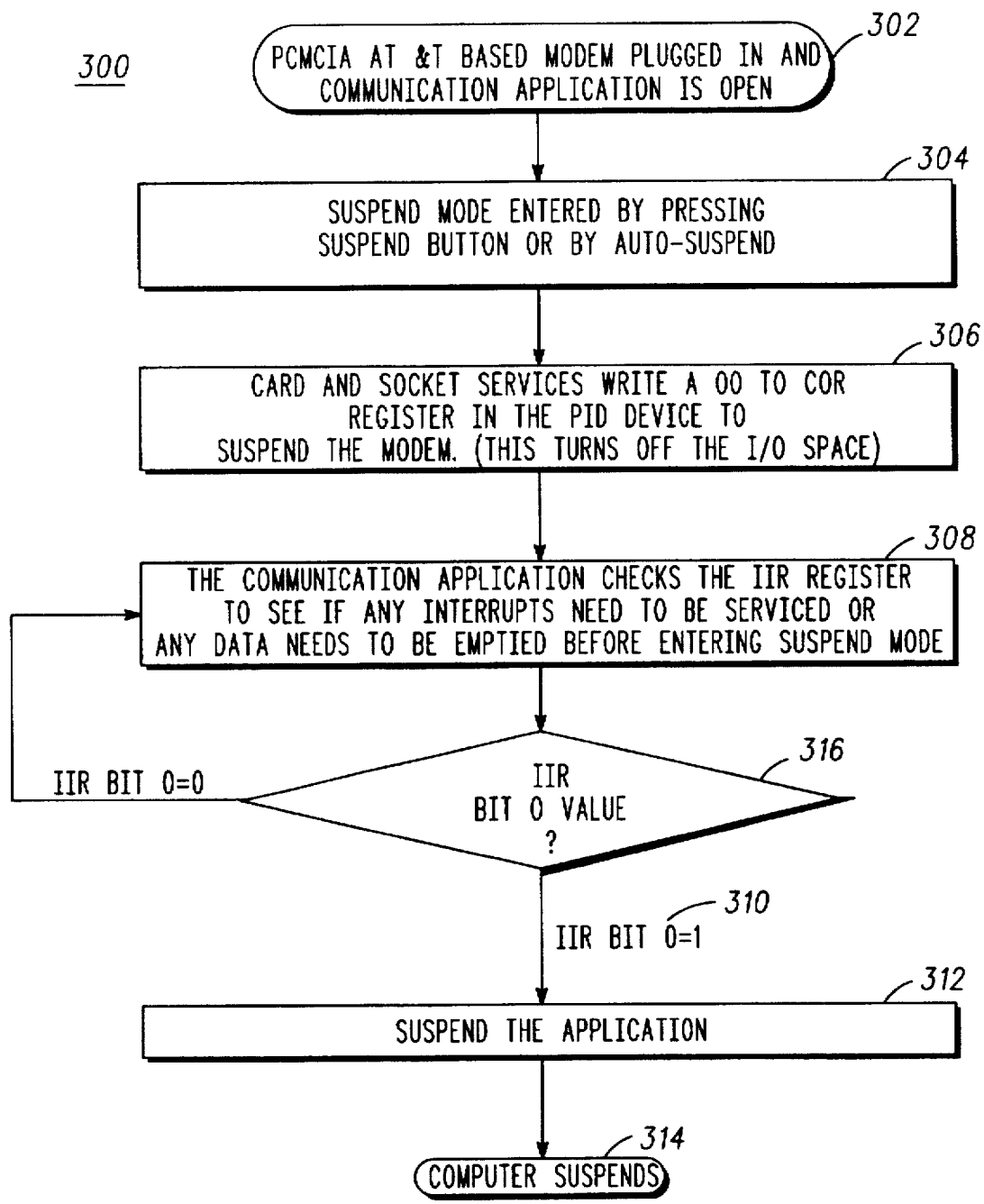
FIG. 3 is a flow diagram representation of system events occurring while entering suspend mode.

FIG. 3, numeral 300, is a flow diagram representation of system events occurring while entering suspend mode. The flow diagram describes the sequence of events as follows: a PCMCIA AT&T HSM PID2 based modem is inserted in the computer and a modem communication application is open and connected to the modem (302); a suspend mode is entered via manual suspend or auto-suspend (304), e.g., Card and Socket Services® write a 00 to a Configuration Option Register, COR, to suspend the modem via turning off the I/O space (306); the modem communication application checks the IIR before it suspends to check if any interrupts need to be serviced or any data needs to be emptied before entering suspend mode (308); the modem communication application expects a value of 1 at bit 0 of the IIR, Interrupt Identification Register (316). The invention forces the bit value to read a logic one (310) and therefore the modem communication application suspends (312), and the computer suspends (314).

Figure 4:
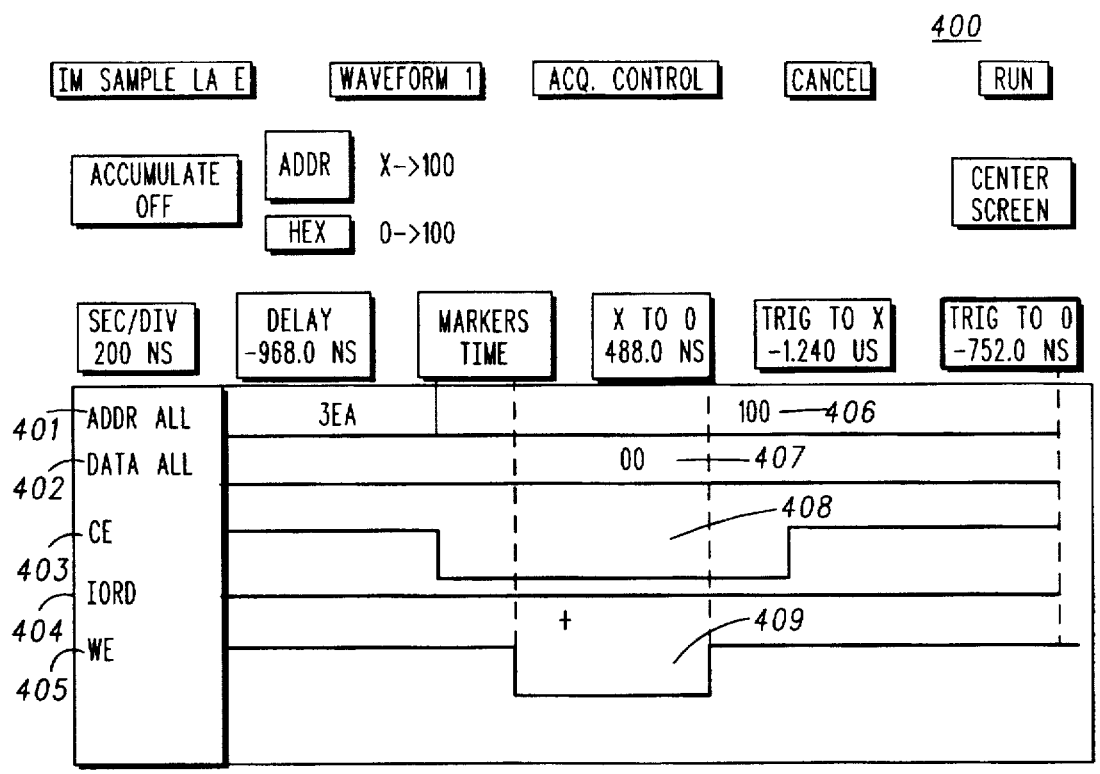
FIG. 4 is a timing diagram representation of read/write cycles for initiation of a power down sequence.

FIG. 4, numeral 400, is a timing diagram representation of read/write cycles for initiation of a power down sequence. As shown in FIG. 4, an example of the problem this invention is solving, as part of the power down preparation sequence, the host computer writes (403, 405) a 0×00 byte (407) to I/O location 0×100 (406), i.e., the PID2 Configuration Option Register, COR.

Whenever the COR is changed, bit 5 programs the PID2 to act as a memory card (bit5=0) or I/O card (bit5=1). Clearly, writing (403, 405) the 0×00 byte (407) to the PID2 programs the PID2 to act as a memory card. Thus, any I/O read cycles (404) generated by the host computer to retrieve data from the modem card will return invalid bytes of data.

In FIG. 4:

1. Item 401 is the logic analyzer output showing the information on the PCMCIA address bus, traces A0 through A11.
2. Item 402 is the logic analyzer output showing the information on the PCMCIA data bus, traces D0 through D7.
3. Item 403 is the logic analyzer output showing the single bit information of the Chip_Enable signal, which is pin 13 of the AT&T HSM PID2 device.
4. Item 404 is the logic analyzer output showing the single bit information of the Input_Output_Read signal, which is pin 15 of the AT&T HSM PID2 device.
5. Item 405 is the logic analyzer output showing the single bit information of the Write_Enable signal, which is pin 14 of the AT&T HSM PID2 device.
6. Item 406 is the logic analyzer output showing the actual values in hexadecimal of the information present on the PCMCIA address bus, item 401.
7. Item 407 is the logic analyzer output showing the actual values in hexadecimal of the information present on the PCMCIA data bus, item 402.
8. Item 408 is the Chip_Enable trace being asserted, active low.
9. Item 409 is the Write_Enable trace being asserted, active low.

Figure 5:
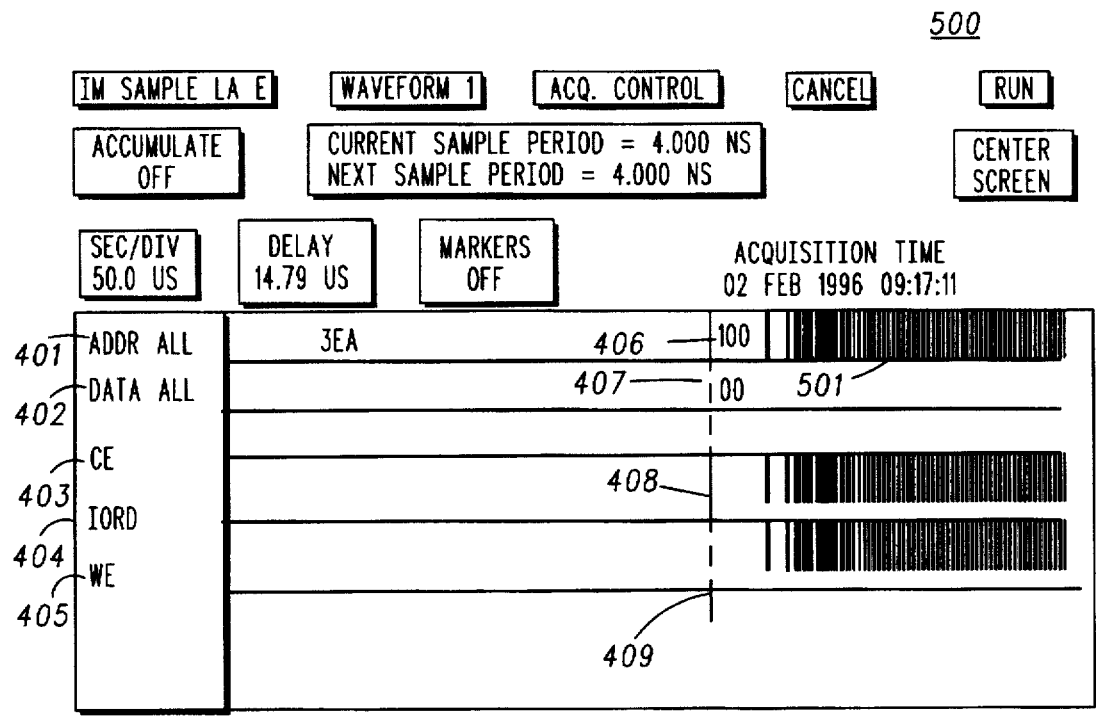
FIG. 5 is a timing diagram representation of the lockupread/write cycles for initiation of a power down sequence.

FIG. 5, numeral 500, is a timing diagram representation of read/write cycles in a system that does not utilize the present invention, when a communications application resident on the host computer reads data from the data bus after the power down sequence has been initiated as in FIG. 4. In FIG. 5, the data is interpreted as coming from the Interrupt Identification Register/Modem Status Register (IIR/MSR). However, the IIR/MSR has just been isolated (FIG. 4 ), i.e., shut off, by programming the PID2, and the data on the data bus is invalid. Due to complex electrical characteristics of the interface between PCIC and PID2, the invalid bits typically consist of zeros and ones, with the least significant bit equal to zero. Hence, the communications application receives an invalid data message indicating additional data still needs to be read from the modem card and therefore, the application will read the IIR register again (501). This process (501) never ends, and the host application software will continue to read invalid data; thus, this ongoing process will not let the system shut down.

When electric components are not actively driving the data bus, the components' outputs are placed into "Tri-State" or high impedance. When all components connected to the data bus are Tri-State, the bus floats, i.e., voltage levels are higher than logic 0 but lower than logic 1, and when an input device reads the data, the states of the bits are unpredictable. When the present invention is utilized, i.e., by placing a resistor, e.g. 10K ohm resistor, on the data line, which is typically a trace electrical path consisting of electrically conductive material, the host computer reads logic ones even after the PID2 device has been unintentionally reprogrammed, with the communications application interpreting the received data as data from the IIR/MSR that indicates that no further data is being sent, i.e., indicating that the UART is in an idle state. Hence, the computer-modem card system then shuts down, and the host computer is free to continue operation.

Figure 6:
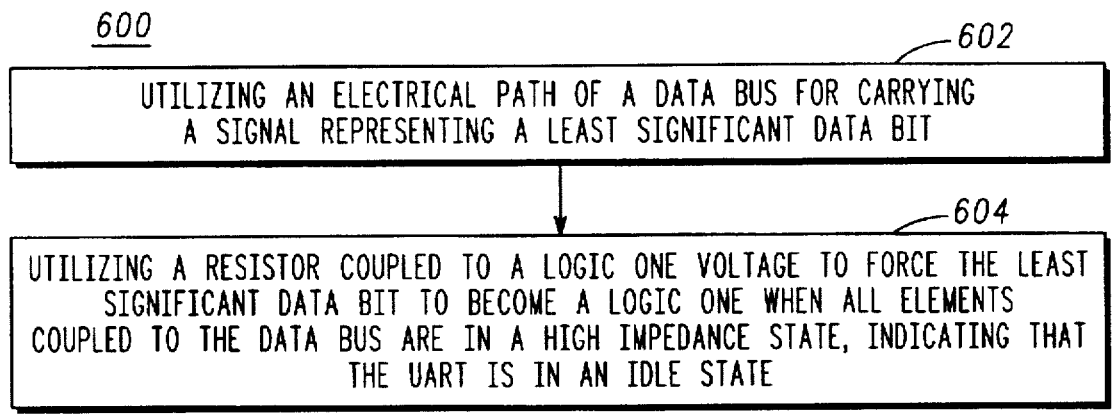
FIG. 6 is a flow chart of one embodiment of steps in accordance with the method of the present invention.

FIG. 6, numeral 600, is a flow chart of one embodiment of steps in accordance with the method of the present invention. When a computer enters a suspend mode, the method provides a simulation of an idle UART in a computer peripheral operably coupled to the computer, wherein the idle UART prevents locking up of the computer by an operating system when a suspend mode is entered. The method includes the steps of: A) utilizing an electrical path of a data bus for carrying a signal representing a least significant data bit (602); and B) utilizing a resistor coupled to a logic one voltage to force the least significant data bit to become a logic one when all elements coupled to the data bus are in a high impedance state (604), indicating that the UART is in an idle state. Again, utilizing the electrical path of the data bus may include utilizing an electrically conductive trace, and the resistor typically has an ohmic value in a range of 2.2K to 100 k ohms. The elements coupled to the data bus generally include at least a PCMCIA interface unit, a controller, and a PCIC, being a peripheral controller interface controller.

Figure 7:
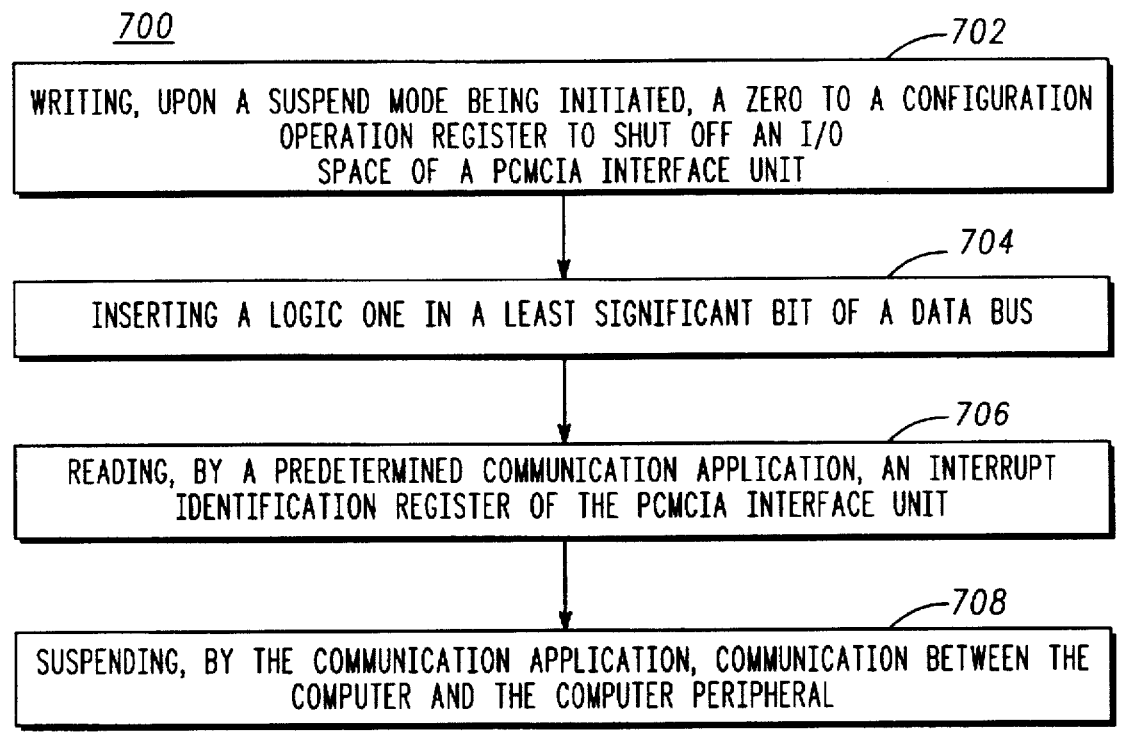
FIG. 7 is a flow chart of another embodiment of steps in accordance with the method of the present invention.

FIG. 7, numeral 700, is a flow chart of another embodiment of steps in accordance with the method of the present invention. The method includes the steps of: A) writing, upon a suspend mode being initiated, a zero to a configuration operation register to shut off an I/0 space of a PCMCIA interface unit (702); B) inserting a logic one in a least significant bit of a data bus (704); C) reading, by a predetermined communication application, an interrupt identification register of the PCMCIA interface unit (706); and D) suspending, by the communication application, communication between the computer and the computer peripheral (708).

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A device for preventing "locking up" of a computer by an operating system when a suspend mode is entered, comprising:

A) an electrical path of a PCMCIA data bus, for carrying a signal representing a least significant data bit; and B) a resistor, coupled to the electrical path of the data bus and to a logic one voltage, for forcing the least significant data bit to become a logic one when all elements coupled to the data bus are in a high impedance state such that the device simulates an idle Universal Asynchronous Receiver Transmitter (UART) operably coupled to the computer thereby preventing the computer from "locking up."

2. The device of claim 1 wherein the resistor has an ohmic value in a range of 2.2K to 100K ohms.

3. The device of claim 1 wherein the elements coupled to the data bus include:

a PCMCIA interface unit, a controller, and a PCIC.

4. The device of claim 1 wherein the device is located on the computer peripheral.

5. A PCMCIA unit that prevents "locking up" of a computer, operably coupled to the PCMCIA unit, by an operating system of the computer when a suspend mode is entered, comprising:

A) an electrical path of a PCMCIA data bus, for carrying a signal representing a least significant data bit; and B) a resistor, coupled to the electrical path of the data bus and to a logic one voltage source, for forcing the least significant data bit to become a logic one when all elements coupled to the data bus are in a high impedance state such that the PCMCIA unit simulates an idle Universal Asynchronous Receiver Transmitter (UART) operably coupled to the computer thereby preventing the computer from "locking up."

6. The PCMCIA unit of claim 5 wherein the resistor has an ohmic value in a range of 2.2k to 100K ohms.

* * * * *